United States Patent Office.

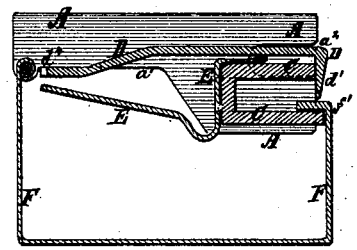
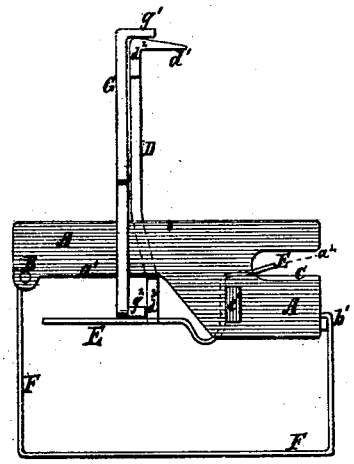
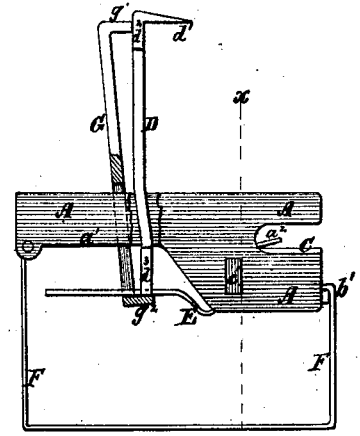
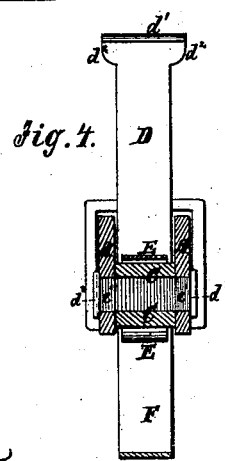

BRYANT H. MELENDY, OF MANCHESTER, NEW HAMPSHIRE.

Letters Patent No. 111,762, dated February 14, 1871.

IMPROVEMENT IN COMBINED KEY-RINGS AND DOOR-FASTENERS.

The Schedule referred to in these Letters Patent and making part of the same.

*To all whom it may concern:*

Be it known that I, BRYANT H. MELENDY, of Manchester, in the county of Hillsborough and State of New Hampshire, have invented a new and useful Improvement in Combined Key-Ring and Door-Fastener; and I do hereby declare that the following is a full, clear, and exact description thereof, which will enable others skilled in the art to make and use the same, reference being had to the accompanying drawing forming part of this specification.

Figure 1 is a detail longitudinal section of my improved key-ring and door-fastener.

Figure 2 is a side view of the same in position for fastening a door, and showing the compensator in place.

Figure 3 is the same view as fig. 2, but showing the compensator in another position, and having parts broken away to show the construction.

Figure 4 is a detail cross-section of the same, taken through the line $x\,x$, fig. 3.

Similar letters of reference indicate corresponding parts.

My invention has for its object to improve the construction of my improved key-ring and door-fastener, patented May 17, 1870, and July 19, 1870, and numbered 103,068 and 105,474, so as to make it lighter, stronger, smaller, and better, and thus more convenient and effective in use; and My invention consists in combining the shoulders upon the inner part of the hook or claw with recessed and shouldered spaces upon the under side of the main frame, when the hook is held in place by a spring-arm; and It also consists in making the compensator detachable, in the manner shown in the drawing, and hereinafter described.

A are the side pieces that form the body of the device, which are connected to each other and held in their proper relative positions by the rivet B at their rear ends and by the stay C at their forward ends.

The edges of the rear parts of the pieces A are cut away, as shown in figs. 1, 2, and 3, to form bearings $a^1$ for the shoulders of the hook D.

The forward ends of the pieces A have notches or slots $h^2$ formed in them to receive the shoulders of the hook D, when the device is closed for carrying in the pocket.

The hook D has a hook or claw $d^1$ formed in its forward end to be forced into the door casing in fastening the door, and shoulders $d^2$ to enter the notches $a^2$ of the pieces A, and which also strengthen the claw $d^1$.

Upon the side edges of the other end of the hook D are formed shoulders $d^3$, which slide along the bearings $a^1$ in adjusting the device for fastening the door.

The rear end of the hook D has a notch $d^4$ formed in it to receive the spring E, by which the said hook D is held in place when fastening the door.

The other end of the spring D projects so as to press against the hook D and hold it in place when closed.

The body of the hook D is bent, as shown in figs. 1, 2, and 3, to give it a suitable shape for operating properly in its different positions.

F is the spring-arm, upon which the keys are strung, and which is made in about the shape shown in figs. 1, 2, and 3.

One end of the spring-arm F is hinged to the pivot B, and its other end is bent to form a hook, $f^1$, which locks into the open end of the stay C.

The stay C is made U-shaped, and with projections $c'$ upon the side edges of its bent end by means of which it is riveted to the pieces A, as shown in figs. 1, 2, and 3.

G is the compensator, which is made with a hole in its rear end, by means of which, when not desired for use, it may be strung upon the spring-arm F, which enables it, when required for use, to be turned or slipped over the rear ends of the pieces A, as shown in figs. 2 and 3.

The compensator G is made with hooks, lips, or flanges $g^1$ $g^2$ upon its forward and rear ends to keep it in place when adjusted for a narrower or wider crack between the door-casing and the forward edge of the door.

When the said crack or space is too wide for the door to force the claw $d^1$ of the hook D sufficiently far into the door-casing to hold firmly, the compensator G is adjusted with its flange $g^1$ overlapping the claw $d^1$ of the hook D, with its flange $g^2$ resting against the rear side of the other end of the hook D and its rear end between the spring E and the edges of the pieces A, as shown in fig. 2, so that the body of the compensator may rest squarely against the body of the hook D.

When the said crack is still too wide for the door to force the claw $d^1$ firmly into the casing the compensator G may be arranged with its forward flange $g^1$ resting against the rear side of the hook D, the spring E in this case passing through the hole in the said compensator G, as shown in fig. 3.

Having thus described my invention,

I claim as new and desire to secure by Letters Patent—

1. The hook D, held in place by a spring-arm, and having shoulders $d^2$ on the inner part thereof, combined as described, with the pieces A, having recesses and shoulders $d^3$ thereon, for the purpose specified.

2. The compensator G, constructed with a hole in its rear end and with lips or flanges $g^1$ $g^2$ upon its ends, in combination with hook D, pieces A, spring E, and spring-arm F, substantially as herein shown and described, and for the purposes set forth.

BRYANT H. MELENDY.

Witnesses:
WILLIAM M. SHEPARD,
CHARLES S. YOUNG.